US012783773B2

(12) United States Patent
Subrahmanyan

(10) Patent No.: US 12,783,773 B2
(45) Date of Patent: Nov. 3, 2026

(54) DOSE MAPPING USING SUBSTRATE CURVATURE TO COMPENSATE FOR OUT-OF-PLANE DISTORTION

(71) Applicant: Applied Materials, Inc., Santa Clara, CA (US)

(72) Inventor: Pradeep Subrahmanyan, Cupertino, CA (US)

(73) Assignee: Applied Materials, Inc., Santa Clara, CA (US)

( * ) Notice: Subject to any disclaimer, the term of this patent is extended or adjusted under 35 U.S.C. 154(b) by 777 days.

(21) Appl. No.: 18/144,832

(22) Filed: May 8, 2023

(65) Prior Publication Data

US 2023/0367941 A1 Nov. 16, 2023

Related U.S. Application Data

(60) Provisional application No. 63/425,060, filed on Nov. 14, 2022, provisional application No. 63/341,797, filed on May 13, 2022.

(51) Int. Cl.

| | |
|---|---|
| ***G06F 30/39*** | (2020.01) |
| ***G06F 119/18*** | (2020.01) |
| ***H10P 14/60*** | (2026.01) |
| ***H10P 14/692*** | (2026.01) |
| ***H10P 74/20*** | (2026.01) |

(52) U.S. Cl.

CPC .......... *G06F 30/39* (2020.01); *H10P 14/6539* (2026.01); *H10P 14/6542* (2026.01); *H10P 14/69215* (2026.01); *H10P 14/6927* (2026.01); *H10P 74/203* (2026.01); *G06F 2119/18* (2020.01)

(58) Field of Classification Search

None

See application file for complete search history.

(56) References Cited

U.S. PATENT DOCUMENTS

2007/0050749 A1* 3/2007 Ye ........................ G03F 7/70625 716/54
2008/0078952 A1 4/2008 Gupta
2016/0290789 A1 10/2016 Smith
(Continued)

FOREIGN PATENT DOCUMENTS

EP 3121833 A1 1/2017
EP 3438749 A1 2/2019
(Continued)

OTHER PUBLICATIONS

International Search Report and Written Opinion for International Application No. PCT/US2023/021424, filing date May 8, 2023, 10 pages.
(Continued)

*Primary Examiner* — Mohammed Alam
(74) *Attorney, Agent, or Firm* — KDW Firm PLLC

(57) ABSTRACT

A method may include generating a residual curvature map for a substrate, the residual curvature map being based upon a measurement of a surface of the substrate. The method may include generating a dose map based upon the residual curvature map, the dose map being for processing the substrate using a patterning energy source; and applying the dose map to process the substrate using the patterning energy source.

19 Claims, 15 Drawing Sheets

(56) References Cited

U.S. PATENT DOCUMENTS

| | | | | |
|---|---|---|---|---|
| 2018/0067403 | A1 | 3/2018 | Devilliers | |
| 2018/0204707 | A1* | 7/2018 | Saib | H01J 37/3023 |
| 2018/0342410 | A1* | 11/2018 | Hooge | H10P 50/00 |
| 2019/0041758 | A1 | 2/2019 | Van Dijk | |
| 2020/0118822 | A1 | 4/2020 | Falk | |
| 2021/0175048 | A1* | 6/2021 | Wilson | H01J 37/244 |
| 2021/0201571 | A1* | 7/2021 | State | G06T 17/20 |
| 2023/0280646 | A1* | 9/2023 | Kim | G03F 7/706841 |
| 2023/0367941 | A1* | 11/2023 | Subrahmanyan | G06F 30/39 |
| 2023/0369014 | A1 | 11/2023 | Subrahmanyan | |

FOREIGN PATENT DOCUMENTS

| | | | | |
|---|---|---|---|---|
| JP | 2001068429 | A | 3/2001 | |
| JP | 2006279041 | A | 10/2006 | |
| JP | 2010212684 | A | 9/2010 | |
| JP | 2018041080 | A | 3/2018 | |
| JP | 2018512738 | A | 5/2018 | |
| JP | 2018524818 | A | 8/2018 | |
| JP | 2020021076 | A | 2/2020 | |
| JP | 6890373 | B2 * | 6/2021 | H01J 37/045 |
| KR | 20170136569 | A | 12/2017 | |
| KR | 1020180107071 | A | 10/2018 | |
| KR | 1020200015426 | A | 2/2020 | |
| TW | 202015109 | A | 4/2020 | |

OTHER PUBLICATIONS

International Search Report and Written Opinion for the International Application No. PCT/US2023/021423, mailed Aug. 30, 2023, 11 pages.

* cited by examiner

DOSE MAPPING USING SUBSTRATE CURVATURE TO COMPENSATE FOR OUT-OF-PLANE DISTORTION

CROSS-REFERENCE TO RELATED APPLICATION

This application claims priority to U.S. provisional patent application Ser. No. 63/341,797, filed May 13, 2022, entitled "DOSE MAPPING USING SUBSTRATE CURVATURE TO COMPENSATE FOR OUT-OF-PLANE DISTORTION," and to U.S. provisional patent application Ser. No. 63/425,060, filed Nov. 14, 2022, entitled "DOSE MAPPING USING SUBSTRATE CURVATURE TO COMPENSATE FOR OUT-OF-PLANE DISTORTION," and incorporated by reference herein in their entirety.

FIELD

The present embodiments relate to stress control in substrates, and more particularly to stress compensation to reduce out-of-plane distortion in substrates.

BACKGROUND

Devices such as integrated circuits, memory devices, and logic devices may be fabricated on a substrate such as a semiconductor wafer by a combination of deposition processes, etching, ion implantation, annealing, and other processes. Often, complete fabrication of devices and related circuitry may entail many hundreds of operations, including dozens of lithography operations. In particular, lithographic operations may require that a given mask to fabricate structures in a given region or level is to be aligned to preexisting structures.

One general concern for fabricating such devices and structures on a substrate such as a semiconductor wafer is the development of in-plane distortion (IPD) which distortion affects the overlay of a layer with respect to an underlying reference layer. IPD is a complex quantity affected by both the out-of-plane distortion (OPD) of the wafer and the alignment scheme employed in Photolithography. OPD is the fundamental wafer quantity and the signature of the residual OPD is critical to the achievable overlay. For example, a type of OPD often encountered is a global wafer curvature that may develop at many instances of processing due to stress buildup in the wafer as a result of processing operations.

Moreover, device processing may generate complex patterns of OPD across a wafer after at any given stage of processing that may tend to affect subsequent processing operations. In a particular example, the complex patterns of OPD may generate overlay errors in a subsequent lithographic masking operation.

With respect to these and other considerations the present embodiments are provided.

DETAILED DESCRIPTION

Figure 1A:
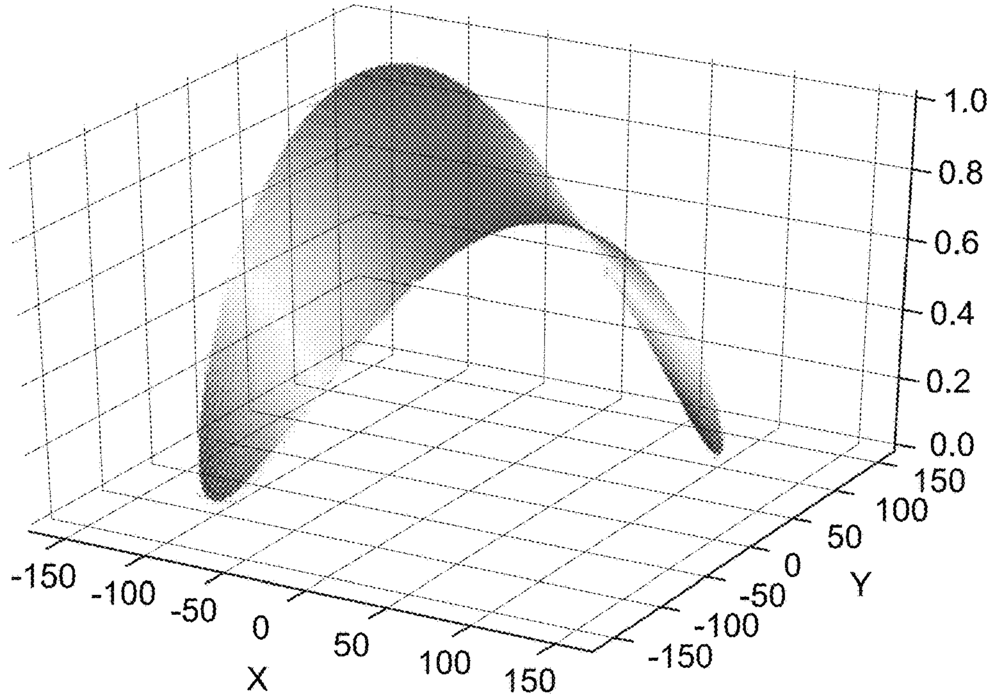
FIGS. 1A-1C illustrate principles of operation of embodiments of the disclosure.

The present embodiments will now be described more fully hereinafter with reference to the accompanying drawings, where some embodiments are shown. The subject matter of the present disclosure may be embodied in many different forms and are not to be construed as limited to the embodiments set forth herein. Instead, these embodiments are provided so this disclosure will be thorough and complete, and will fully convey the scope of the subject matter to those skilled in the art. In the drawings, like numbers refer to like elements throughout.

The embodiments described herein relate to techniques and apparatus for improved control of out-of-plane distortion in a substrate, and the related control of the effects of OPD on substrate processing operations, such as device fabrication. The present embodiments may employ novel techniques to determine dose maps to be applied to a compensation layer of a substrate by a patterning energy source, in order to better correct OPD, and thus to reduce or minimize in-plane-distortion (IPD) that affects device fabrication and other patterning procedures. Non-limiting examples of patterning energy sources include an ion beam or a laser beam that are scannable with respect to a main plane of a substrate.

In various embodiments detailed herein a substrate (also referred to frequently as a "wafer") may be measured to determine a substrate OPD map. This OPD map can then be used to extract the global OPD, which entity is defined as the best fit paraboloid to the measured OPD. Computations are also performed to extract a global substrate curvature component corresponding to the paraboloid while the residual OPD is used to extract the localized or residual substrate curvature.

Figure 1B:
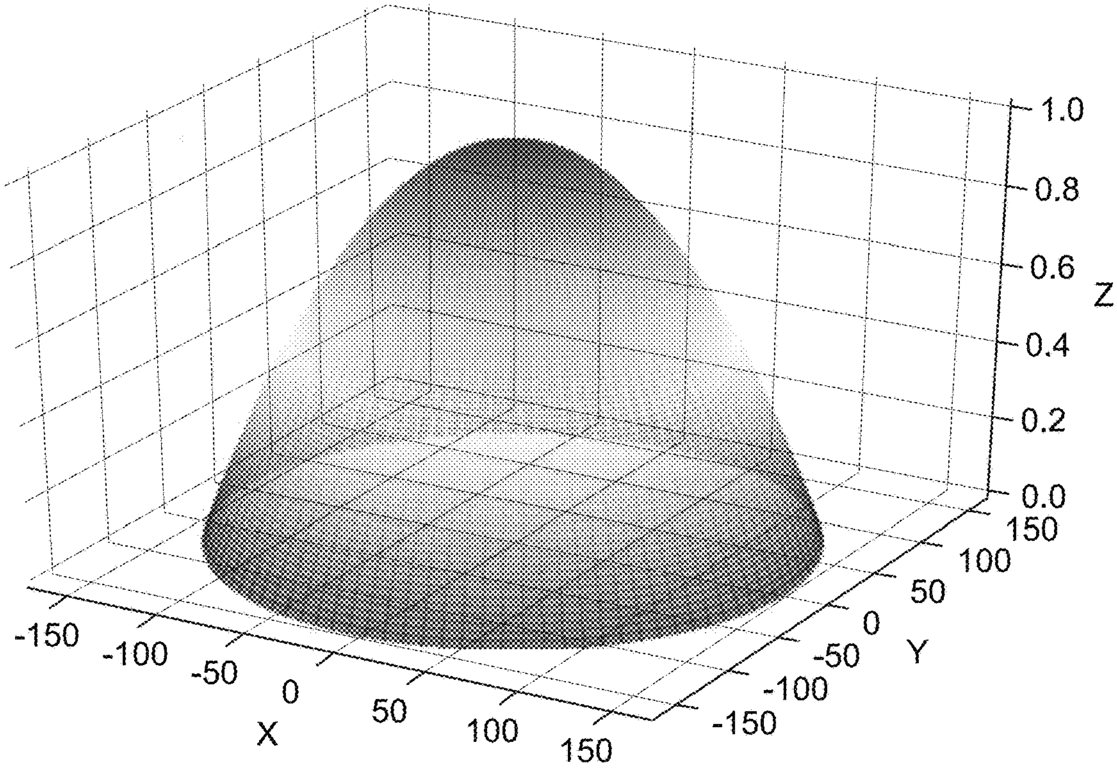
Figure 1C:
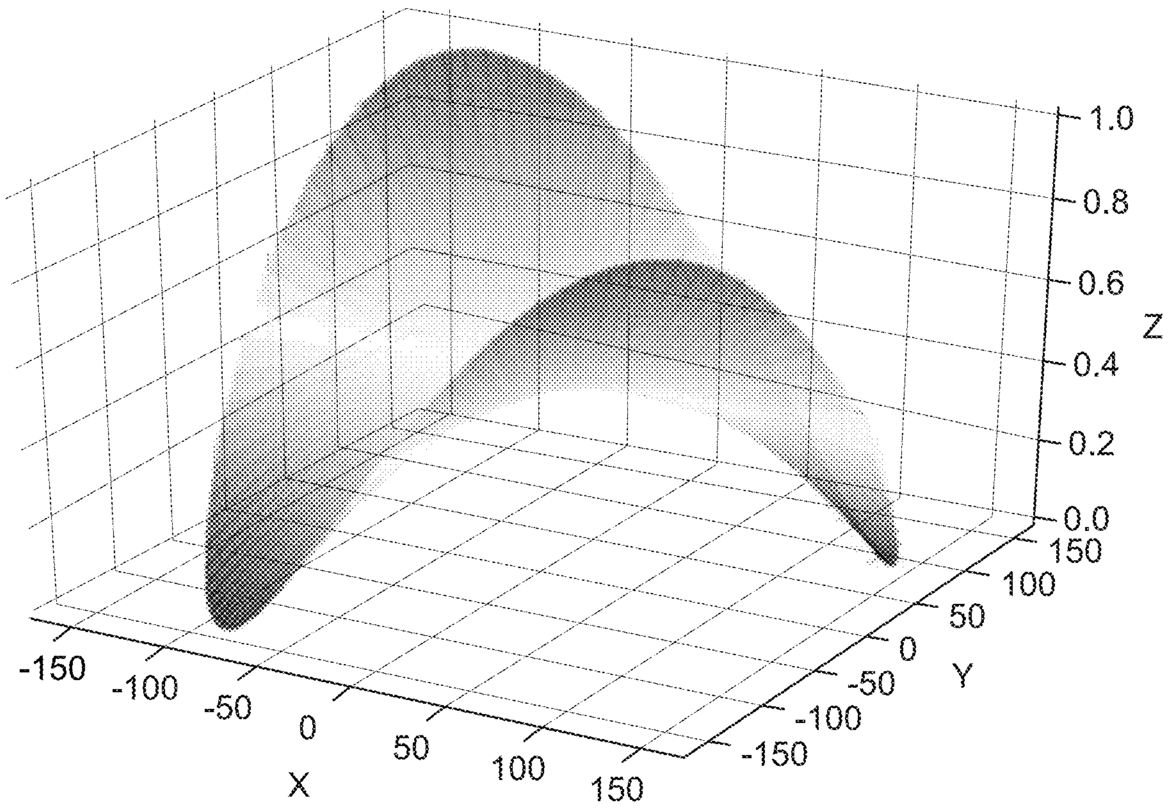

FIGS. 1A-1C illustrate principles of operation of embodiments of the disclosure. Turning to FIG. 1A, there is shown a three dimensional graph depicting a wafer surface with reference to the Cartesian coordinate system shown. In particular, the graph of FIG. 1A depicts the shape of a nominally circular and flat wafer, where the X-Y plane may represent the nominal main plane of the wafer, or equivalently the ideal plane of a flat platen that supports the wafer. The units shown in the X-Y plane may be in millimeters, in one example. The z-axis represents the normal to the main plane of the substrate, and therefore any locations on the substrate that do not lie in the X-Y plane at z=0 may be deemed to represent OPD. Note that the z-axis is dimensionless and is normalized to 1. During semiconductor wafer processing, the buildup of stress during fabrication of layers, devices and the like may result in stresses that tend to impart a global curvature of the substrate, such as a paraboloid shape, shown in FIG. 1B. This shape may be associated with biaxial tensile stress or compressive stress. In some non-limiting examples, the level of OPD may reach a maximum value in the range of hundreds of micrometers, such as 100 μm, 200 μm, 300 μm, 400 μm, etc.

According to embodiments of the disclosure, the OPD as represented by the wafer shape of FIG. 1A may be compensated for in a series of operations. In a first operation, represented in FIG. 1B, the bulk of the OPD may be compensated for using a uniform stress compensation layer that is applied to the back surface of a substrate, opposite a front surface of the substrate, where devices are fabricated. The graph of FIG. 1B represents the spatial distribution in the X-Y plane of the amount of strain or deformation (represented along the Z-axis) of the wafer that may be generated by the uniform stress compensation layer. Again, the relative amount of deformation along the Z-axis is normalized, so that in the graph of FIG. 1, the maximum deformation is at the wafer center. The operation of FIG. 1B may be useful to compensate for relatively large global OPD that develops across the wafer, as represented by the paraboloid shape in FIG. 1B. The shape of such OPD may be axisymmetric about the z-axis, and the operation of FIG. 1B may generally reduce the stress in an axisymmetric fashion. As such, after the application of the operation represented by FIG. 1B, the global curvature of a wafer may be largely removed.

Turning to FIG. 1C there is a graph representing an example of a residual pattern of OPD, which pattern may be superimposed upon the pattern of FIG. 1B. Depending on the nature of the die layout and other patterning features on a wafer, complex "residual" OPD patterns that are not necessarily axisymmetric and may be more localized may be present even after the removal of a global OPD pattern such as in FIG. 1B. As such, the present embodiments address this phenomenon by applying so called dose maps to a patterning energy source, such as a scannable ion beam, electron beam, or laser beam. As detailed below, the patterning energy source may be applied in a non-uniform manner to a substrate, such as into a preexisting compensation layer, in order to remove the residual OPD patterns.

Figure 2A:
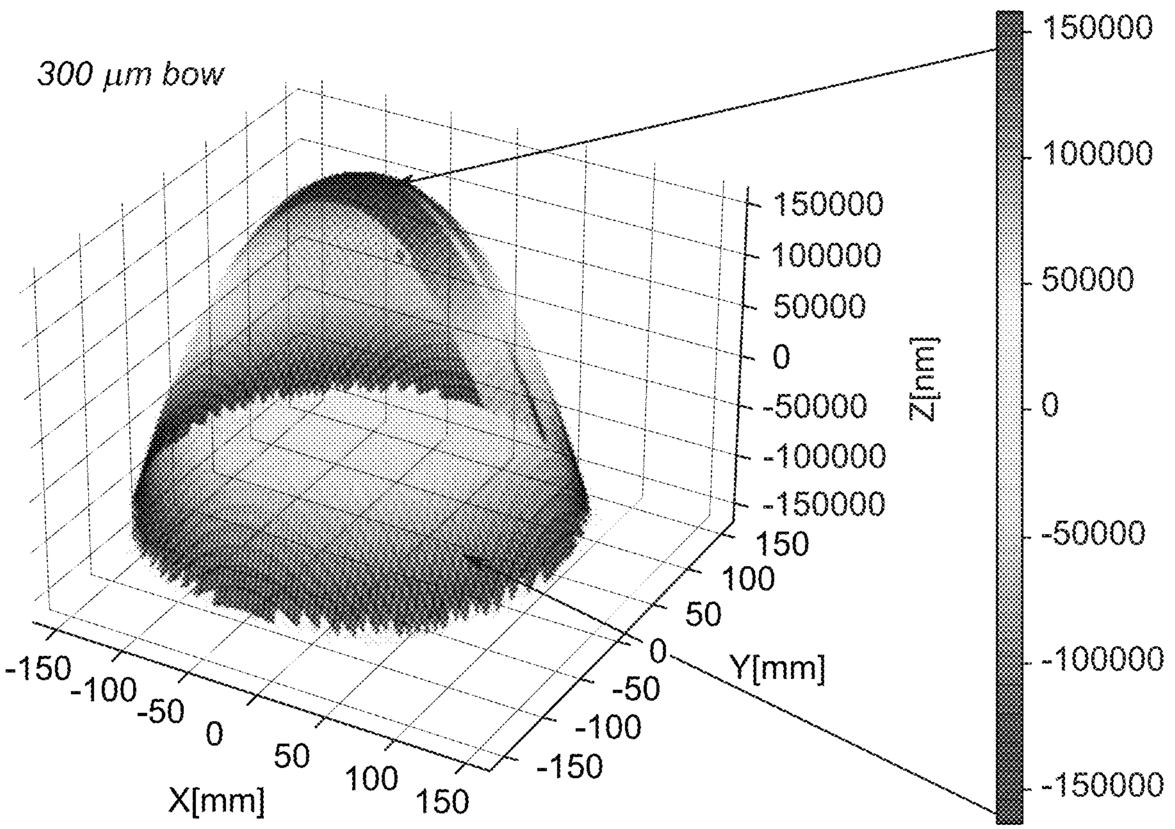
FIGS. 2A-2F depict different representations of the OPD for a wafer at different stages of processing according to embodiments of the disclosure.
Figure 2B:
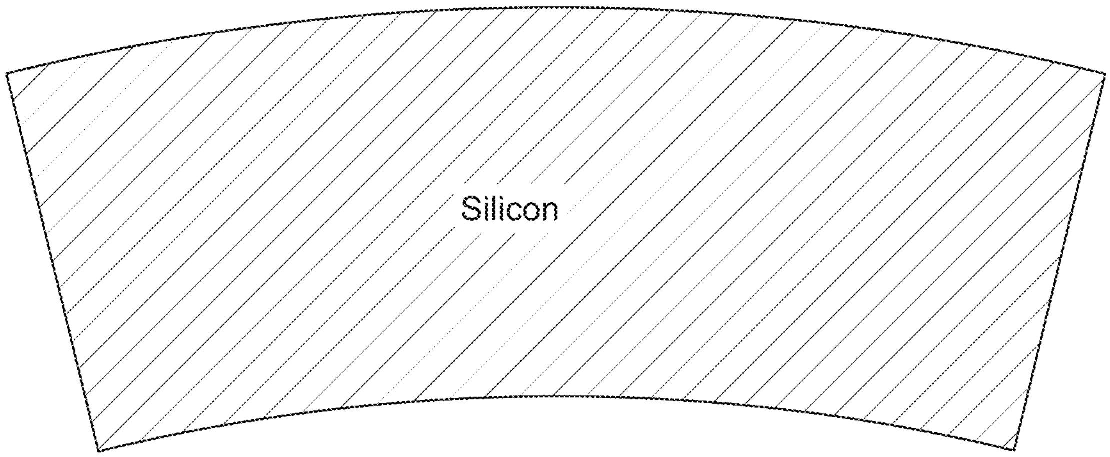
Figure 2C:
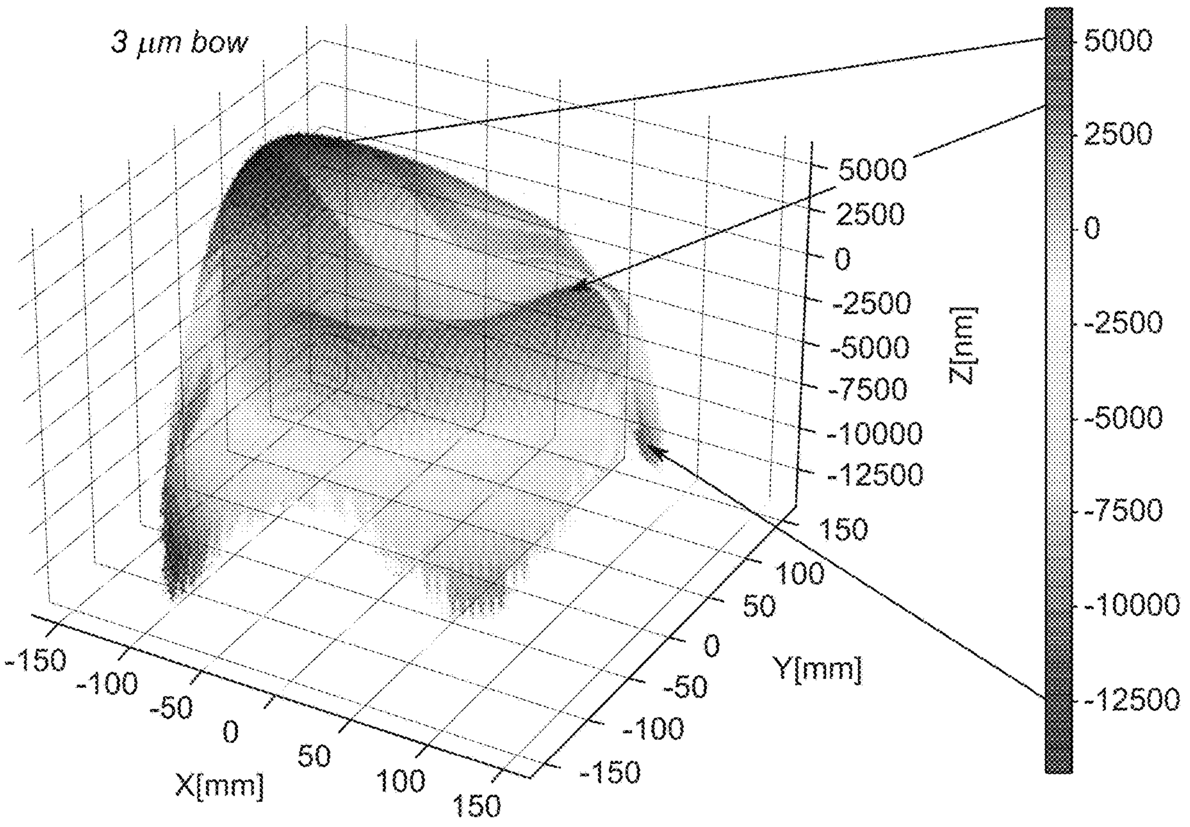
Figure 2D:
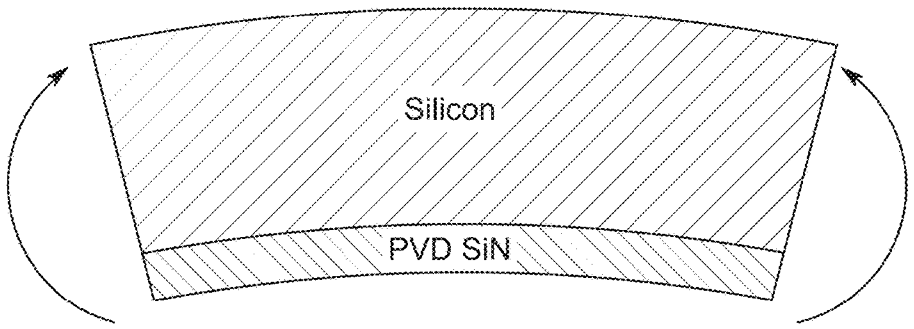
Figure 2E:
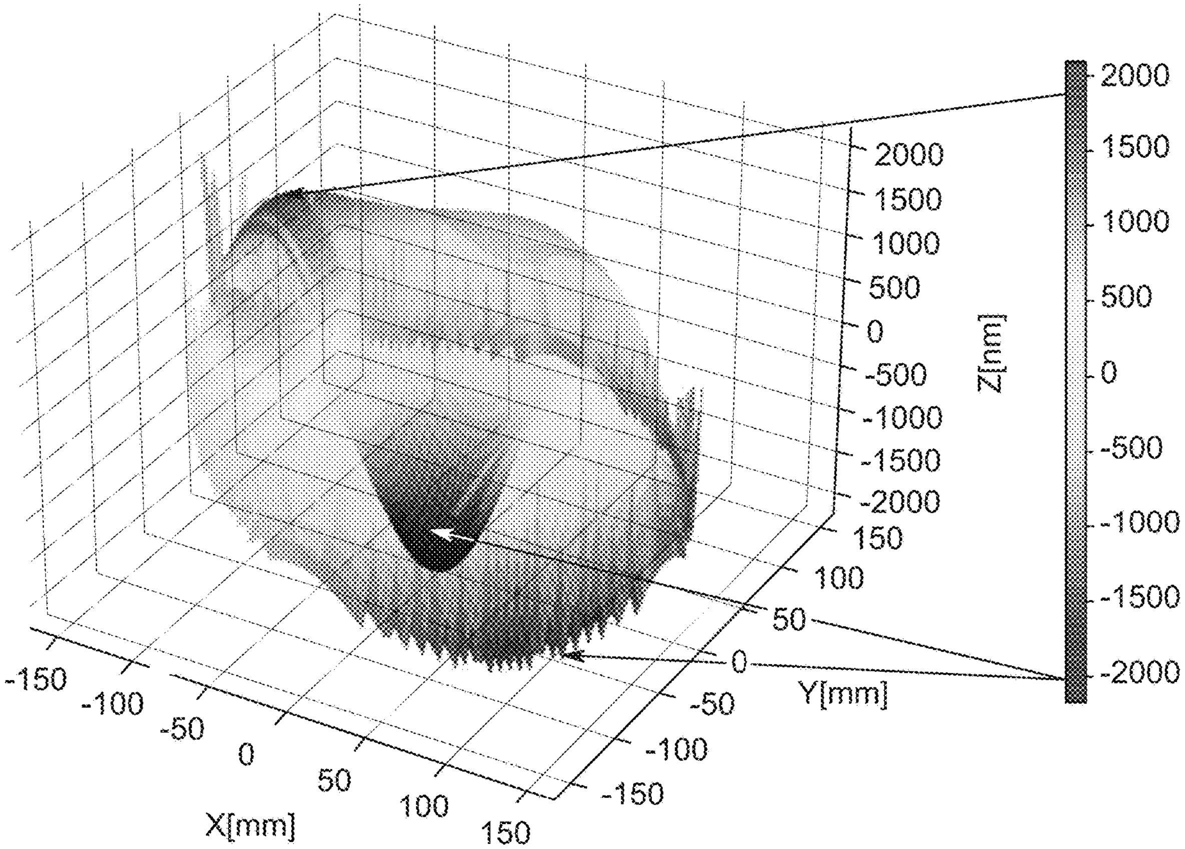

FIGS. 2A-2F depict different representations of the OPD for a wafer at different stages of processing according to embodiments of the disclosure. In these examples, as in FIG. 1A, the units of the x- and y-axes for FIGS. 2A, 2C, and 2E are illustrated in millimeters, representative of a 300 mm wafer, for example. The units along the z-axis are in nm. These graphs accordingly present a three dimensional depiction of a wafer surface, where the z-axis coordinate for an ideally flat wafer would be constant, for example, 0, over the entire x-y plane.

In the example of FIG. 2A, a wafer surface is represented by a three dimensional array of points. The wafer surface may be characterized as a somewhat paraboloid shape, characterized by z-axis coordinates ranging from −150,000 nm to +150,000 nm, equivalent to a maximum OPD of 300,000 nm or 300 μm. A side cross-sectional view of an infinitesimal portion of the substrate (which substrate may be silicon in some embodiments) of FIG. 2A is shown in FIG. 2B in very general form. A front surface in this example is represented by the top surface in the figure, where additional device layers may or may not be present, but are omitted for simplicity. The surface shown in FIG. 2A may represent a wafer surface before processing to reduce OPD in accordance with embodiments of the disclosure.

Turning to FIG. 2C, the wafer surface corresponding to the wafer of FIG. 2B is shown after processing to deposit a stress compensation layer on the backside of the wafer, as shown in FIG. 2D. The stress compensation layer may be deposited by a known apparatus, such as a physical vapor deposition (PVD) apparatus, a chemical vapor deposition (CVD) apparatus, or other film deposition system according to different non-limiting embodiments. Examples of suitable materials for the stress compensation layer include silicon nitride, silicon oxide, silicon oxynitride, layers containing any combinations of Si—O—N—C, or other known materials. At this juncture, the wafer surface may be characterized as an irregular shape, where the absolute value of OPD is greatly reduced, such that the maximum value of OPD is on the order of just several micrometers.

At this stage of processing, the deposition of the stress compensation layer may be said to have removed the global signature of the stress state across the entire wafer that generates the generally regular paraboloid shape to the wafer on the vertical scale of several hundred micrometers. For example, the deposition of a uniform stress compensation layer over a surface of the wafer can be expected to modify the average shape of the wafer according to the well-known Stoney equation, relating substrate curvature changes to the stress properties of a layer in contact with the substrate. According to embodiments of the disclosure, the layer thickness and stress state of the stress compensation layer may be chosen to reduce global curvature of a wafer in accordance with the initial level of curvature, as depicted in FIG. 2A. As discussed further below, the global curvature may be modeled using different possible models, in order to provide a basis to determine the suitable stress compensation layer properties needed to remove the global curvature. Thus, in the example of FIG. 2C and FIG. 2D, a stress compensation layer having suitable thickness, suitable elastic modulus, and suitable stress state may be chosen in order to remove nearly all of the global curvature component that generates the 300 mm maximum OPD in FIG. 2A. Thus, in FIG. 2C what remains is a somewhat irregular pattern of OPD, representing residual curvature that may result from artifacts such as die arrangement, certain device or circuit structures, etc., that are present on the front surface of the wafer. This irregular pattern of OPD may lead to unwanted IPD at different regions of the substrate, causing problems such as increased overlay misalignment for subsequent substrate patterning.

Figure 2F:
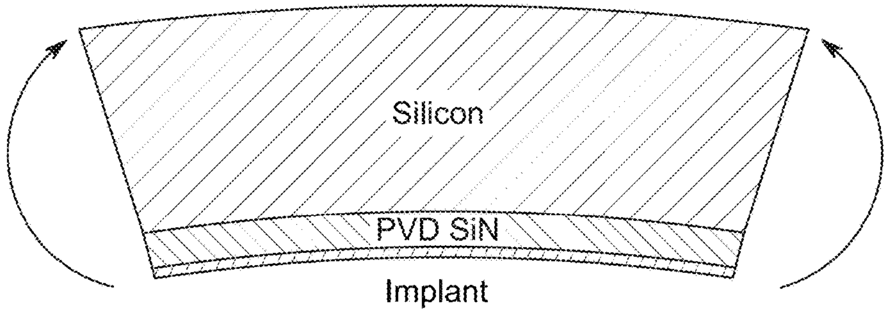
Figure 2G:
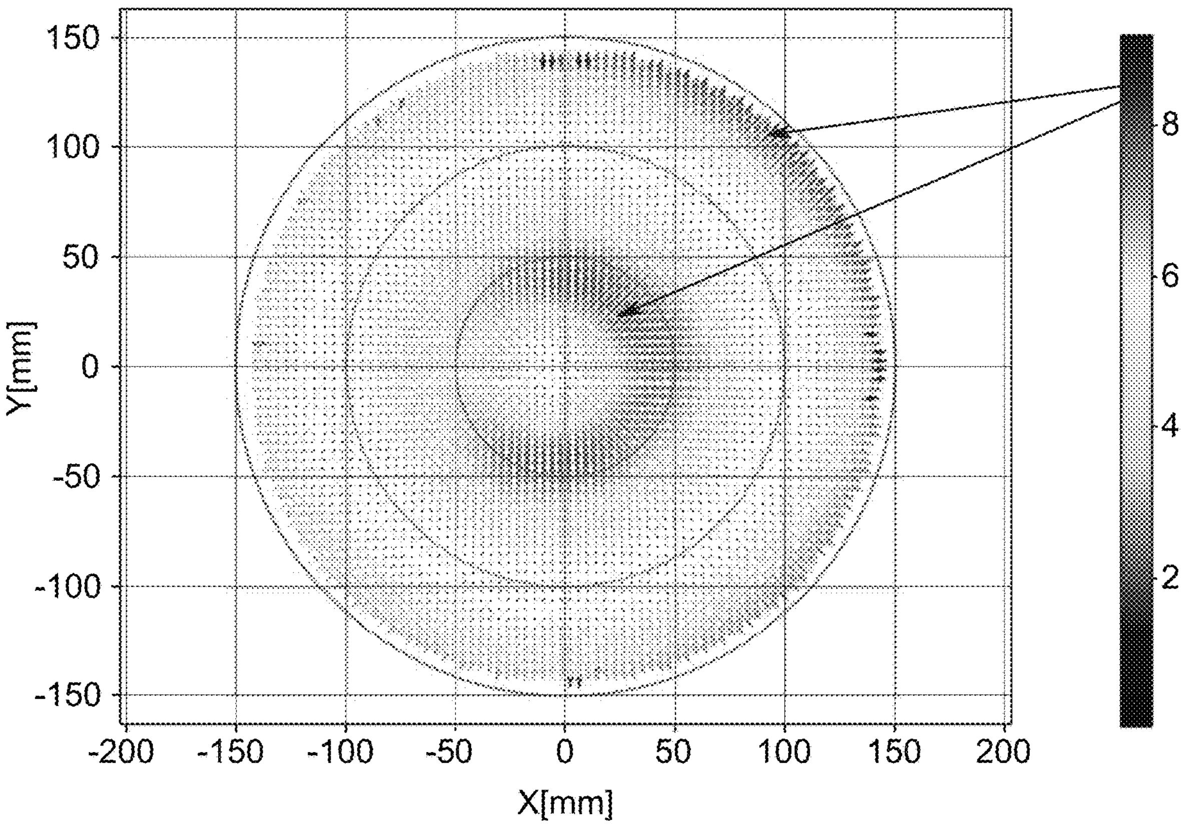
FIG. 2G is the resulting IPD assuming a HOWA3 alignment scheme on a scanner.

According to the embodiment of FIGS. 2E and 2F, the residual curvature exhibited by the substrate of FIG. 2C may be removed, reduced, or modified by performing an exposure to a patterning energy source, as discussed previously. In the particular example shown in FIG. 2F, an implant procedure has been performed to generate an implant layer in the stress compensation layer, where the implant procedure may involve a non-uniform, direct write, implant process. In this context, a 'direct write' process, including a direct write implant process, may refer to a process that employs relative movement of an ion beam without the use of a mask in order to produce a non-uniform pattern of ion dose across a substrate surface. The non-uniform implant process may locally adjust the curvature of the wafer in a manner reducing the OPD, as shown in FIG. 2F. In other embodiments, a direct write process involving an exposure to electrons or photons, such as a laser beam, may be used to locally adjust curvature of a wafer. As detailed below, the patterning process to locally adjust substrate curvature may be performed using a dose map that is calculated based upon measured values of the initial surface of a wafer before stress compensation layer deposition. Note that the correction of OPD that is applied using a suitable dose map to modify the residual curvature of FIG. 2C may translate into a correction of IPD over the wafer, as represented in FIG. 2G. This figure shows a 2-dimensional map in the x-y plane illustrating the magnitude and direction of IPD correction as a function of x,y coordinate in the wafer, for a 300 mm wafer.

FIGS. 3A-5C depict a sequence of operations to be applied to determine a dose map for processing a substrate in order to compensate for substrate OPD in accordance with embodiments of the disclosure. In particular, the progression illustrated in FIGS. 3A-5C illustrates an approach to eliminate residual curvature in a substrate surface.

Figure 3A:
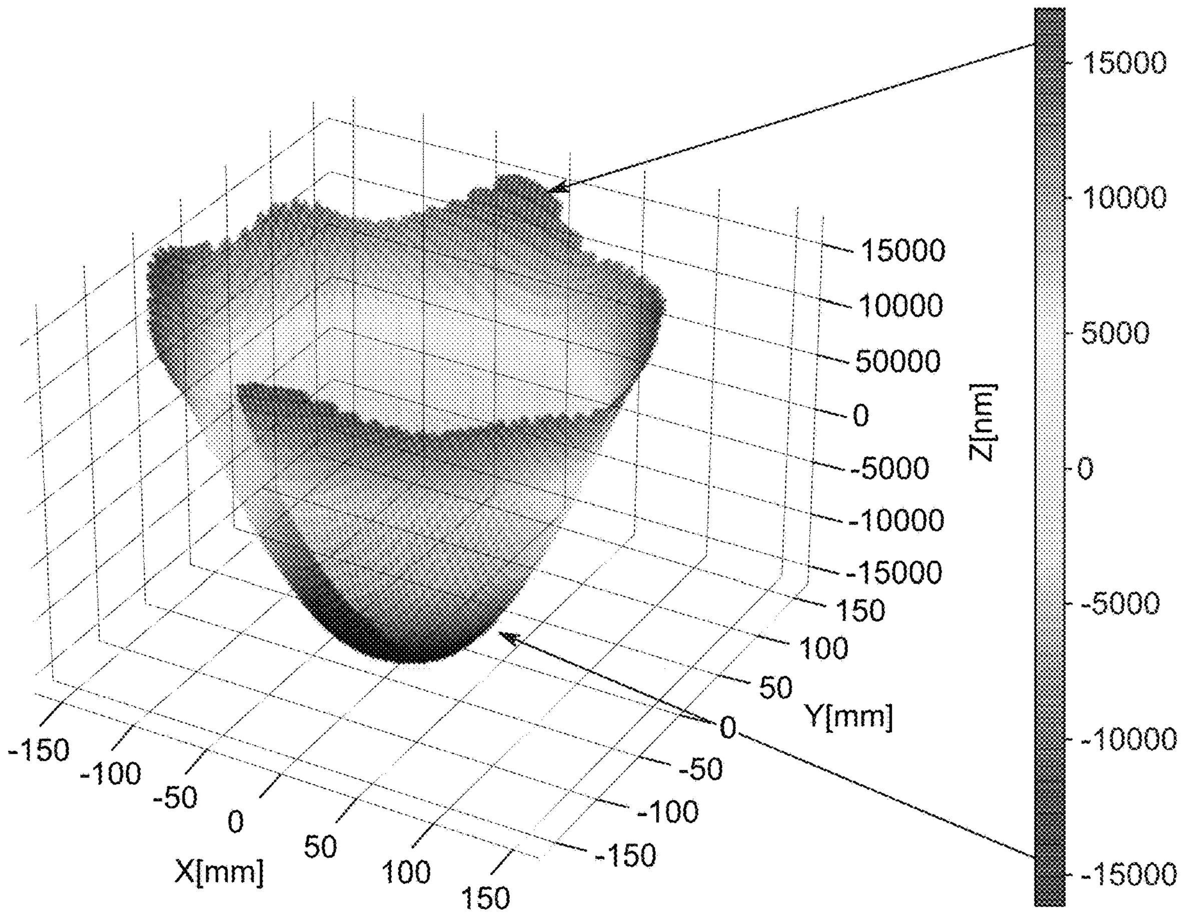
FIGS. 3A-5D depict a sequence of operations to determine a dose map for processing a substrate in order to compensate for substrate OPD, according to embodiments of the disclosure.
Figure 3B:
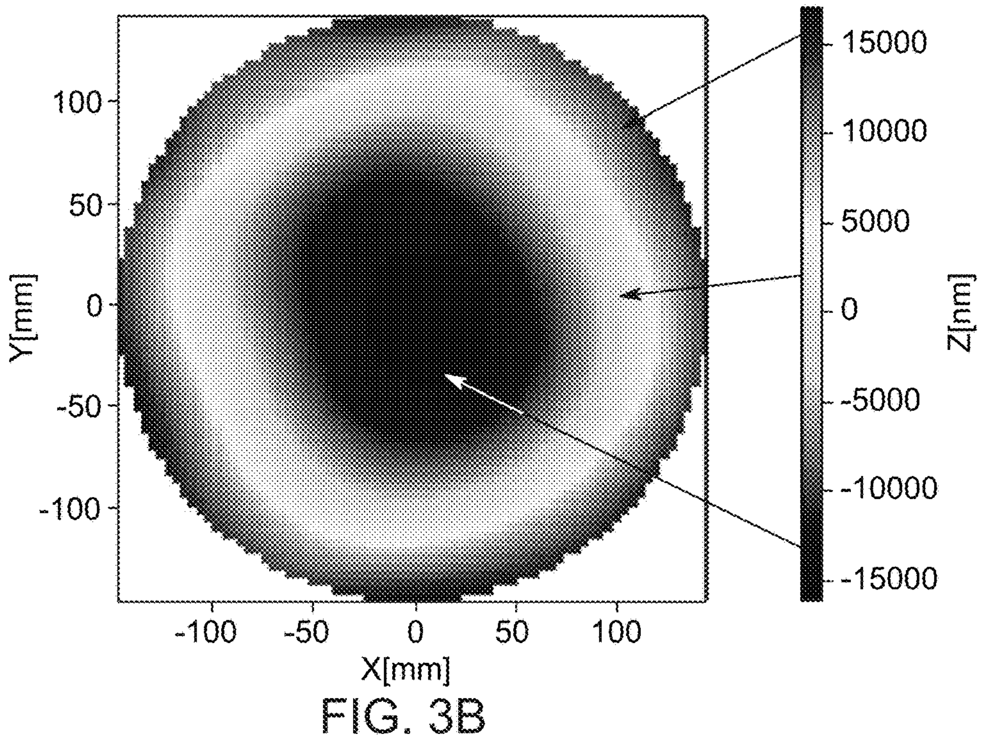
Figure 3C:
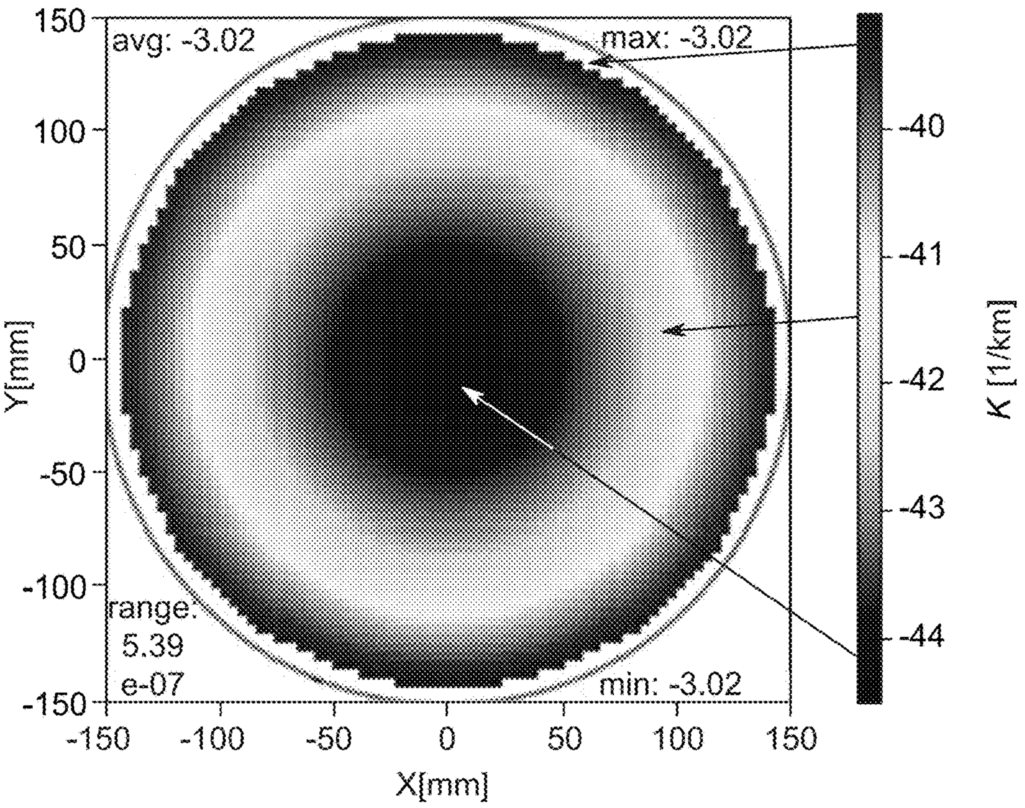

In FIGS. 3A-3C there are shown details for determining global curvature of a substrate in order to generate a global curvature map. FIG. 3A depicts a three dimensional representations of a wafer surface, before extraction of a global curvature component, as generally discussed above, with respect to FIGS. 2A-2E. FIG. 3B illustrates a two-dimensional representation of the surface of FIG. 3A, where the surface is generally paraboloid in nature. The range of OPD show in the figures in this example is merely exemplary and may vary over a wide range, as will be appreciated by those of skill in the art. While the global curvature is intended to be removed using a blanket processing operation to deposit a blanket film on the back side of the substrate, it may not always be possible to do so, due to process variations. Accordingly, a residual component of the global curvature may still be left behind on the wafer. This global curvature still has a parabolic OPD signature and appears as a mostly uniform curvature over the entire wafer on a curvature map.

Figure 3D:
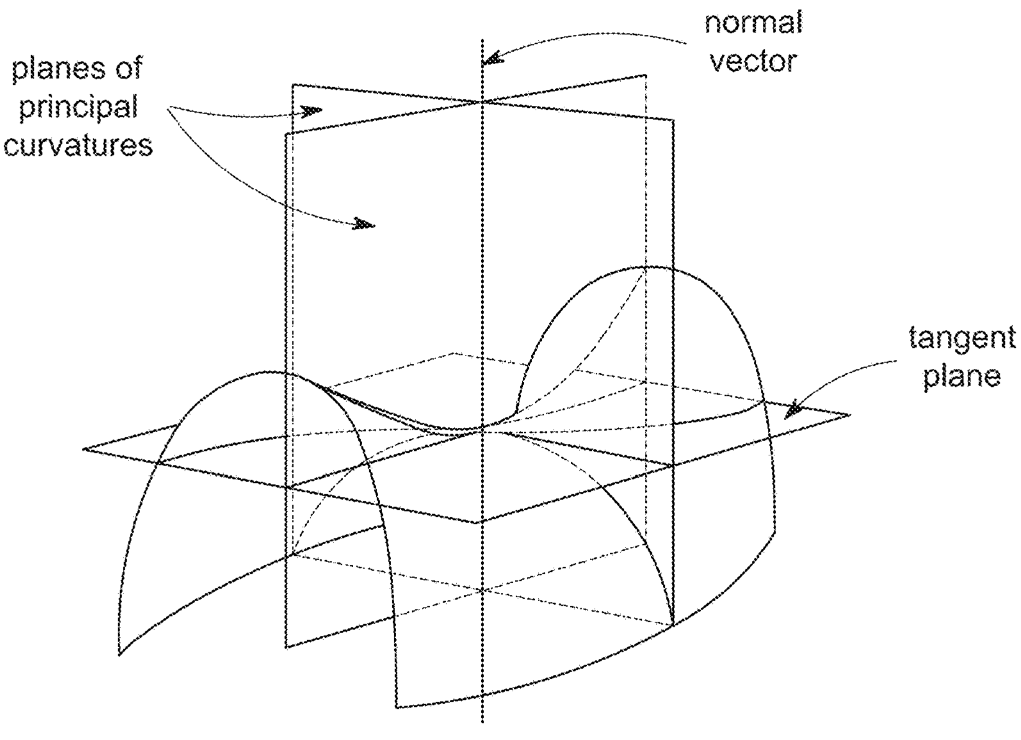

FIG. 3C depicts a global curvature map representing the values of curvature as a function of x,y coordinate over the wafer surface. The units k are in inverse km. According to different non-limiting embodiments of the disclosure, the global curvature may be modeled based upon a Gaussian curvature model or a mean curvature model. The modeling may be based upon the use of two mutually orthogonal principle planes of curvature, that extend perpendicularly to a tangent plane of the surface, as shown in FIG. 3D. In a Gaussian model, a product of the maximal and minimal curvatures is taken, where κ is given by $$\kappa = \kappa_1 \kappa_2 \quad \text{Eq (1)}$$

In a mean model, a mean of the principal (maximal and minimal) curvatures is taken, where κ is given by $$\kappa = \frac{1}{2}(\kappa_1 + \kappa_2) \quad \text{Eq. (2)}$$

As shown in FIG. 3C the global curvature is mostly uniform over the entire wafer.

Figure 4A:
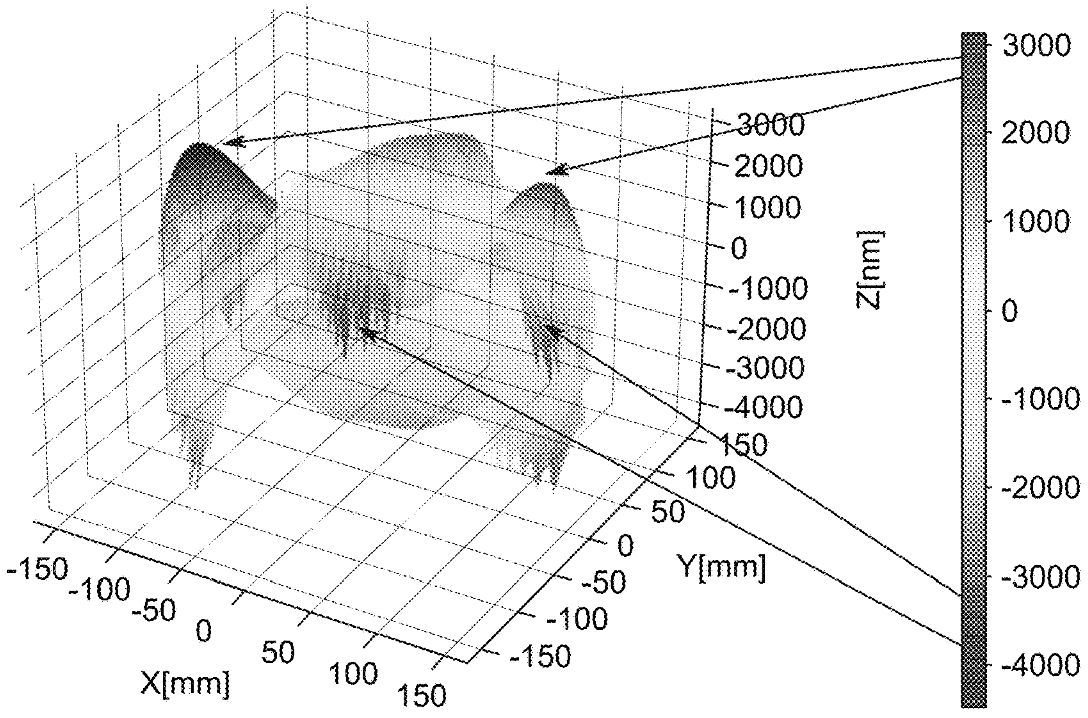
Figure 4B:
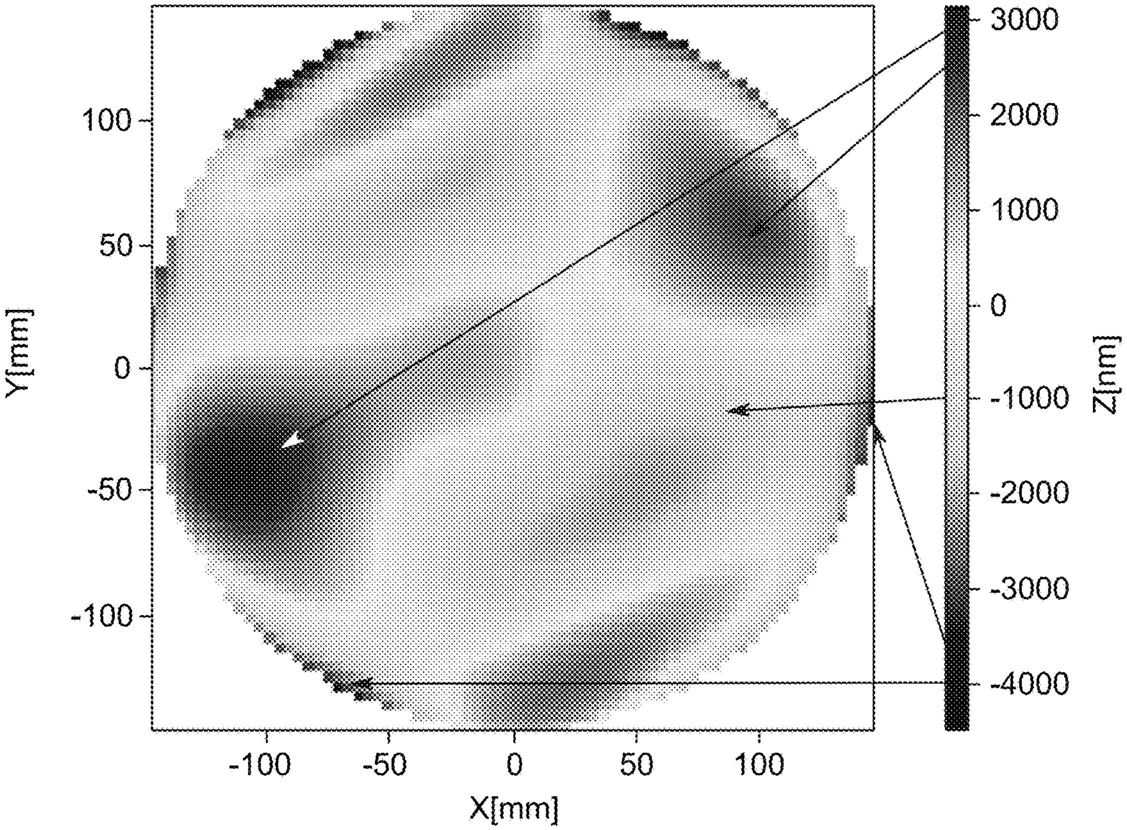

FIG. 4A depicts a three dimensional representations of the residual wafer surface corresponding to the same wafer whose global surface is shown in FIG. 3A, after extraction of the parabolic term of the OPD. FIG. 4B illustrates a two dimensional representation of the surface of FIG. 4A, where the pattern of OPD is rather complex.

Figure 4C:
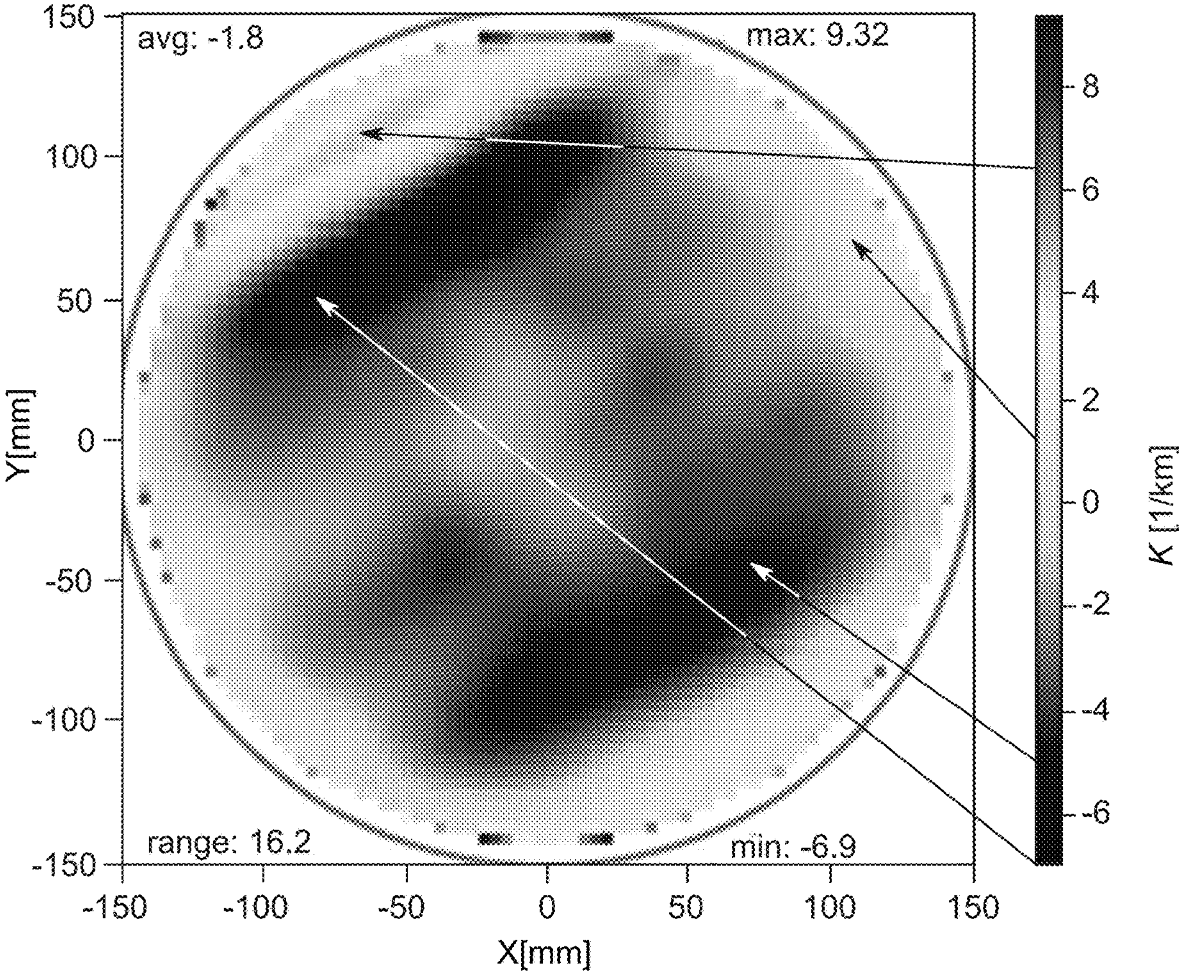

FIG. 4C depicts a residual curvature map representing the values of curvature as a function of x,y coordinate over the wafer surface for the surface of FIGS. 4A and 4B. According to embodiments of the disclosure, the procedures as generally outlined above to model global curvature may be employed to generate the residual curvature map of FIG. 4C, based upon the OPD map of FIG. 4B.

As shown in FIG. 4C the pattern of residual curvature shows a complex set of features. Generally, the curvature values over most of the wafer are relatively low, while a donut shaped region of negative curvature exists towards the center of the wafer. In some areas on the wafer, the curvature has a positive value, such as around the wafer periphery, and along the donut shaped region the curvature has a negative curvature value.

Figure 5A:
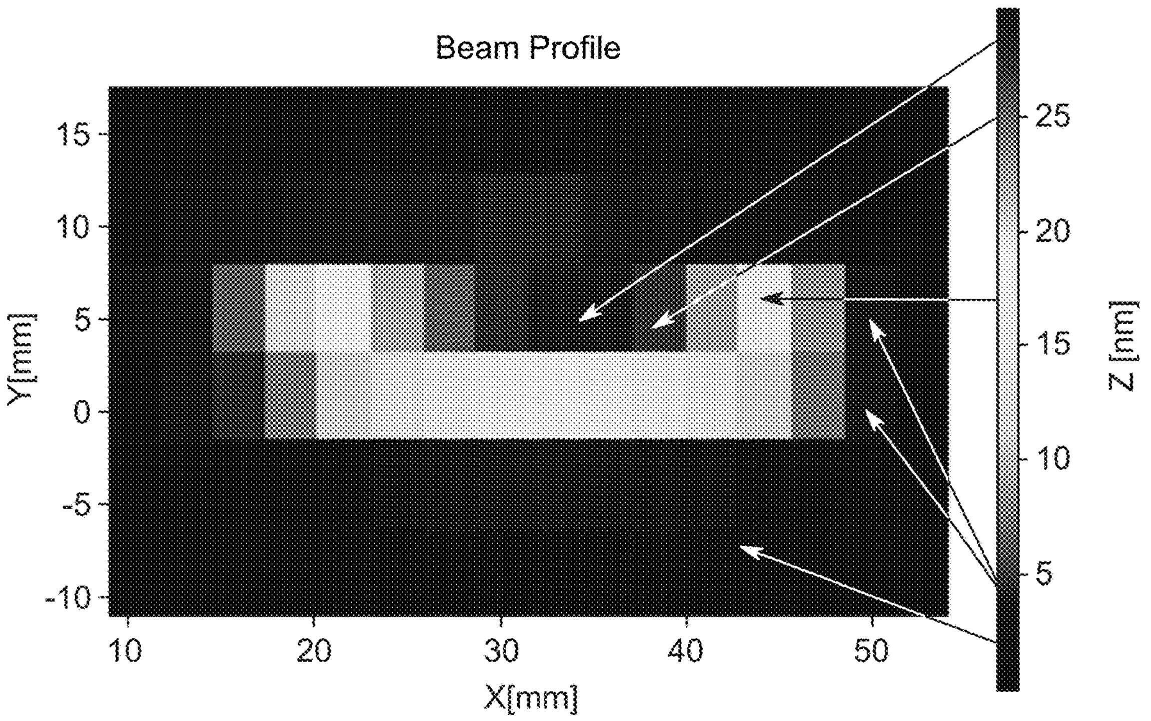
Figure 5B:
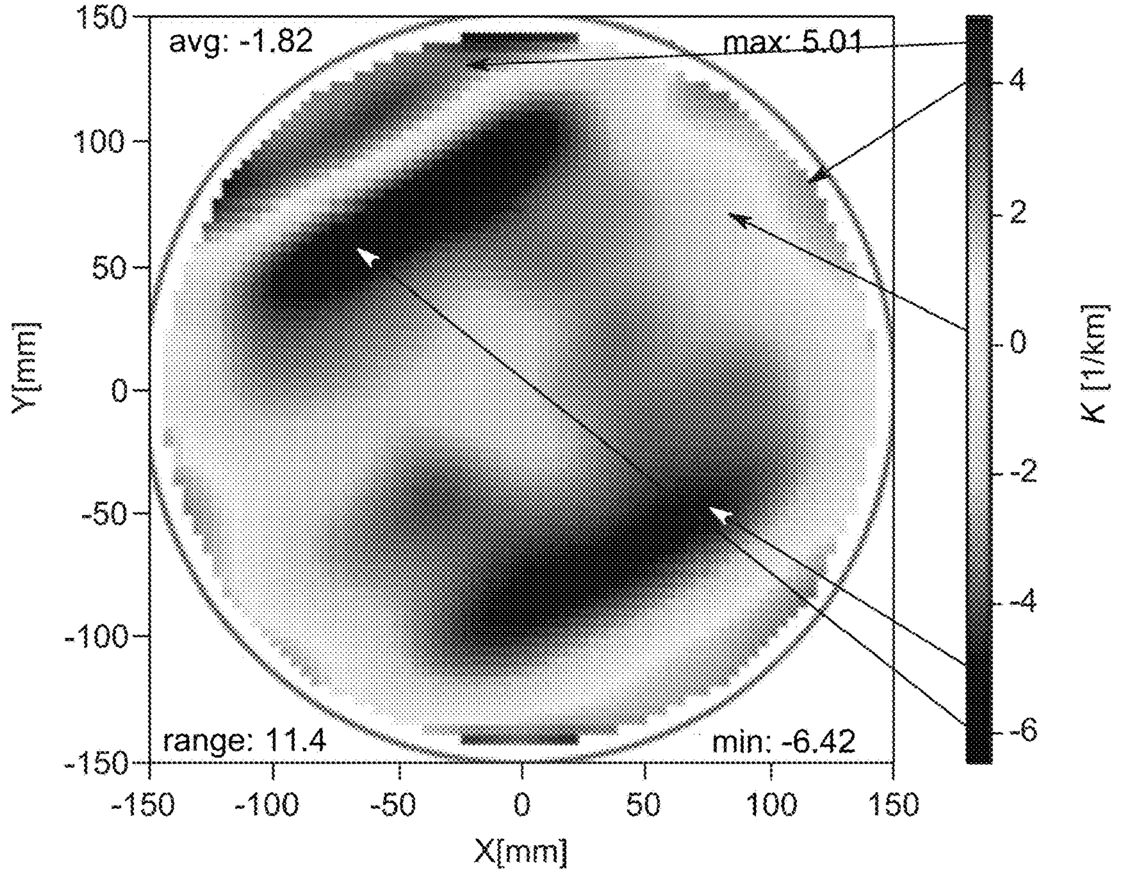

The residual curvature map of FIG. 4C may be considered to be a raw residual curvature map that is further processed to generate a final curvature map that is used to produce a dose map. In turn, the dose map may be used in order to process the wafer of FIG. 3A to remove residual curvature features and thus eliminate or reduce IPD resulting from such features. FIG. 5A shows an ion-beam profile that may be used for the actual wafer implantation. This profile is used in a blur kernel operation to create a blur kernel to be applied to the residual curvature map of FIG. 4C to attenuate the effect of high spatial frequencies on the implanter. The profile may then be used to generate a blurred residual curvature map, shown in FIG. 5B. The blurred residual curvature map of FIG. 5B presents the same qualitative pattern of positive curvature and negative curvature regions, while the width of the regions is broader and the curvature values within the regions differ somewhat from their unblurred counterparts. This blurred curvature map may be more suitable for implementation by a patterning energy source, such as a scanning ion beam, taking into account the finite size of the ion beam.

Figure 5C:
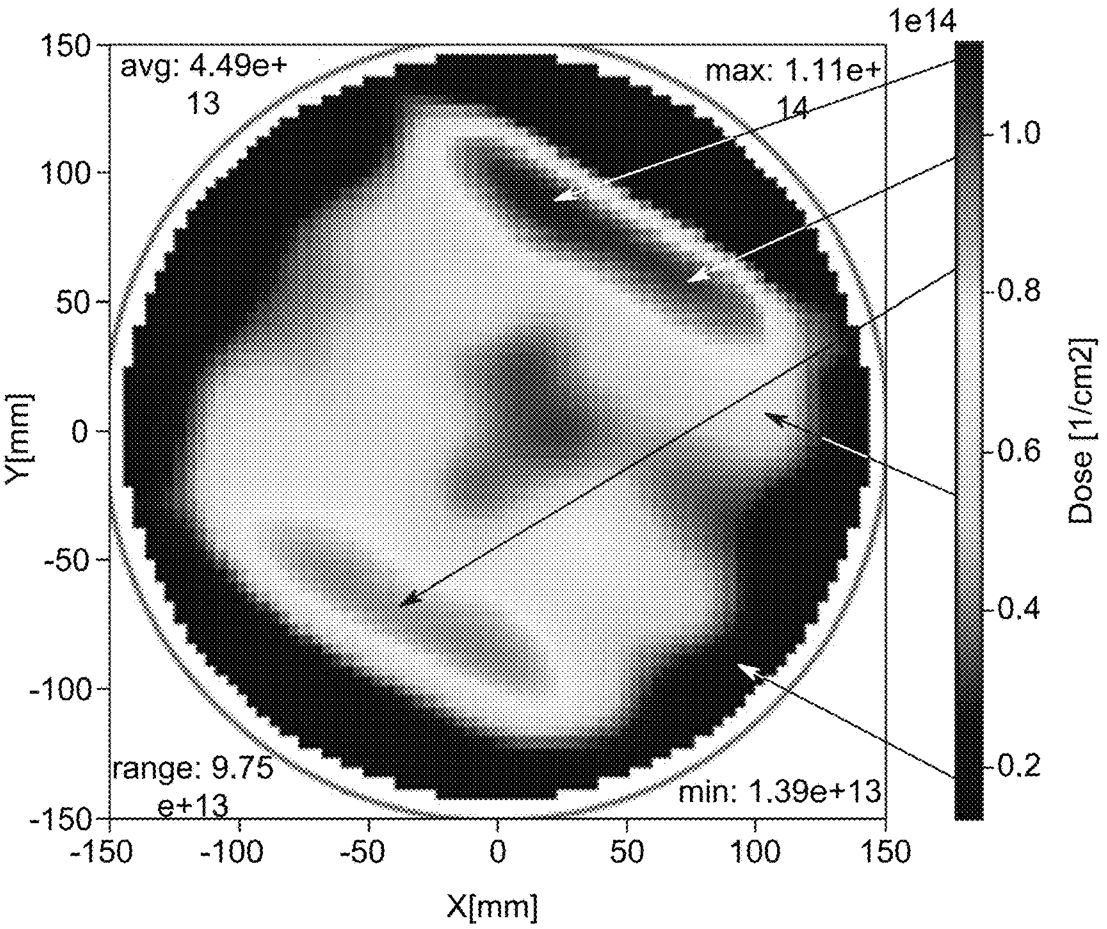

Turning to FIG. 5C, there is shown a filtered residual curvature map that is generated by filtering the blurred residual curvature map of FIG. 5B to remove all positive terms of curvature, since the positive terms cannot be influenced by the ion beam. As a result, two major, somewhat linear regions of relatively higher negative curvature remain, as well as some regions of lesser negative curvature protruding from the linear regions. This map may then be converted into a dose map, such as for a scannable ion beam, where the total ion dose to be applied over the two dimensional surface of the wafer (x-y plane) is based upon the curvature map features of FIG. 5C. Thus, the pattern of ion dose for a suitable dose map may exhibit features having the same shapes as the features of the curvature map.

Figure 5D:
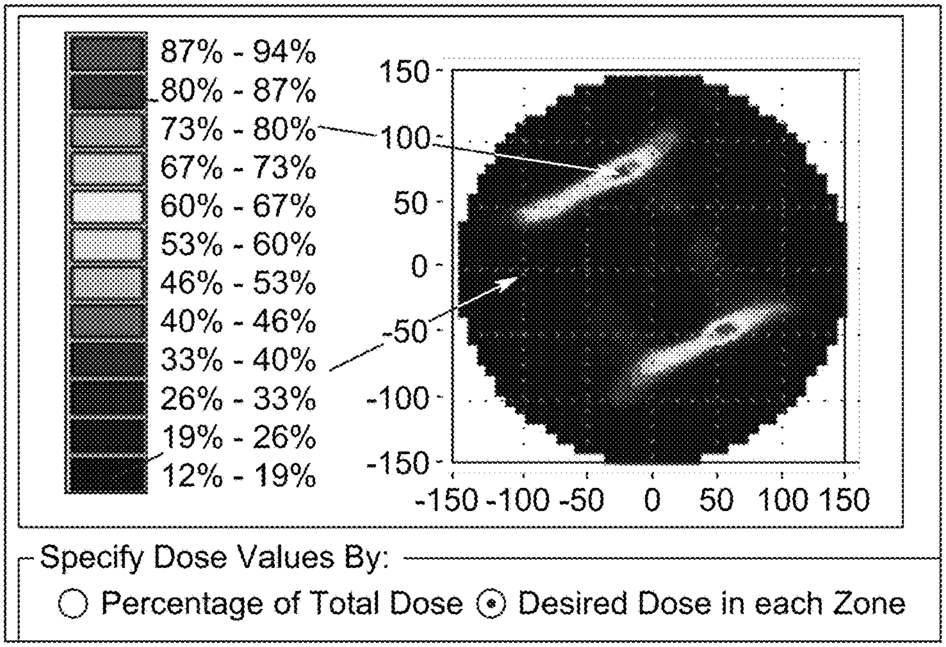

FIG. 5D provides an exemplary ion dose map, based upon the curvature map of FIG. 5C, where the dose map exhibits qualitatively similar pattern as the curvature map of FIG. 5C. In this example, the two parallel linear regions of the dose map, corresponding to the high curvature linear regions of the filtered curvature map are to receive substantially higher dose than the general 'background' regions. For example, the background regions, over most of the surface of the wafer, are to receive a relative ion dose in the range of 15%, while the linear regions are to receive a relative ion dose ranging between approximately 50% and 85%.

Figure 6A:
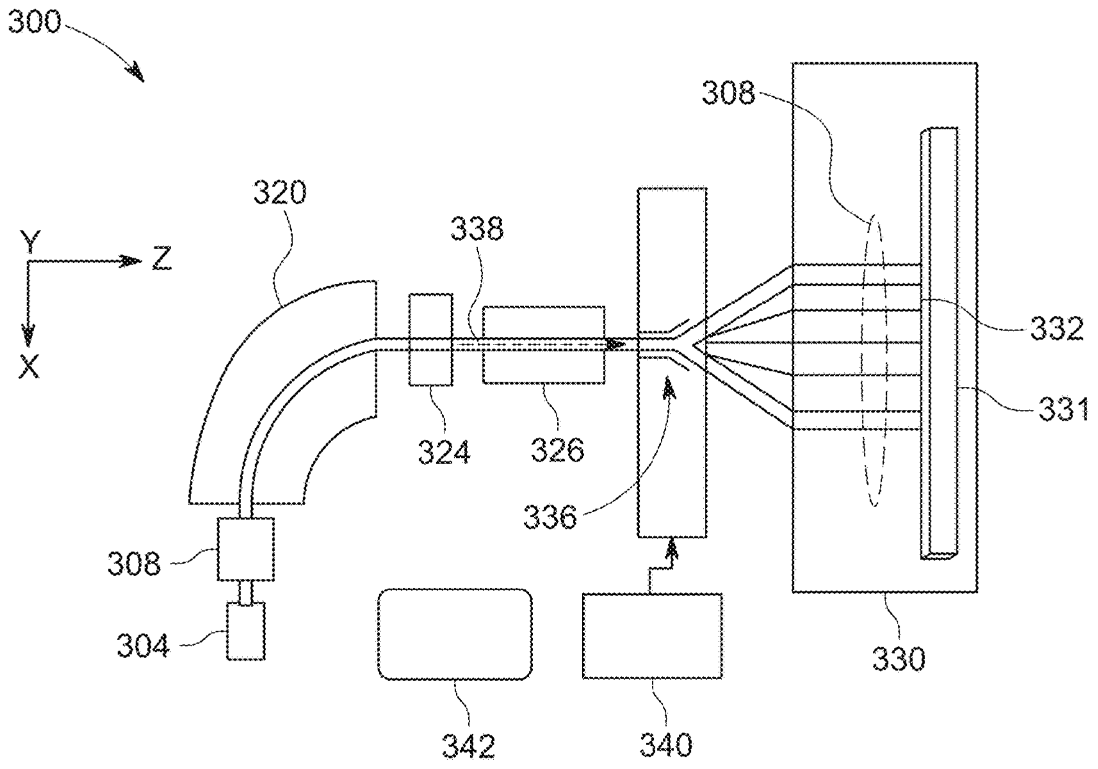
FIGS. 6A-6B depict different representations of an ion implanter, consistent with various embodiments of the disclosure.

FIG. 6A depicts a schematic top view of an ion implantation system for controlling substrate OPD in accordance with embodiments of the disclosure. The ion implantation system, referred to as ion implanter 300, represents a process chamber containing, among other components, an ion source 304 for producing an ion beam 308, and a series of beam-line components. The ion source 304 may comprise a chamber for receiving a flow of gas and generating ions. The ion source 304 may also comprise a power source and an extraction electrode assembly (not shown) disposed near the chamber. The beam-line components may include, for example, an analyzer magnet 320, a mass resolving slit (MRS) 324, a steering/focusing component 326, and end station 330, including substrate holder 331.

The ion implanter 300 further includes a beam scanner 336 positioned along a beamline 338 between the MRS 324 and the end station 330. The beam scanner 336 may be arranged to receive the ion beam 308 as a spot beam and to scan the ion beam 308 along a fast scan direction, such as parallel to the X-Axis in the Cartesian coordinate system shown. Notably, the substrate 332 may be scanned along the Y-axis, so a given ion treatment may be applied to a given region of the substrate 332 as the ion beam 308 is simultaneously scanned back and forth along the X-axis. The ion implanter 300 may have further components, such as a collimator as known in the art (not shown for clarity), to direct ions of the ion beam 308, after scanning, along a series of mutually parallel trajectories to the substrate 332, as suggested in FIG. 6A. In various embodiments, the ion beam may be scanned at a frequency of several Hz, 10 Hz, 100 Hz, up to several thousand Hz, or greater. For example, the beam scanner 336 may scan the ion beam 308 using magnetic or electrostatic scan elements, as known in the art.

By scanning the ion beam 308 rapidly over a fast scan direction, such as back and forth over along the X-axis, the ion beam 308, configured as a spot beam, may deliver a targeted ion dose for any given region of the substrate in the x-y plane. Suitable ions for ion beam 308 may include any ion species capable of inducing a stress change at a suitable ion energy, including ions such as phosphorous, boron, argon, indium $BF_2$, according to some non-limiting embodiments, with ion energy being tailored according to the exact ion species used. To implement a dose map, the scan speed of the ion beam along the x-axis may be modulated at different locations of the substrate 332 so as to deliver a different ion dose at the different locations, in accordance with the dose map. Generally, the ion beam 308 may be scanned back and forth across a substrate for any suitable number of scans, with an accompanying scanning of the substrate in an orthogonal direction to the beam scan direction, until the targeted dose as specified by a dose map is received at reach region across the substrate 332.

For example, the ion implanter 300 may further include a controller 340, coupled to the beam scanner 336, to coordinate operation of the beam scanner 336, as well as substrate holder 331. As further shown in FIG. 6A, the ion implanter 300 may include a user interface 342, also coupled to the controller 340. The user interface 342 may be embodied as a display, and may include user selection devices, including touch screens, displayed menus, buttons, knobs, and other devices as known in the art. According to various embodiments, the user interface 342 may send instructions to the controller 340 to generate an appropriate implant pattern, which pattern may implement an appropriate dose map for the substrate 332.

Figure 6B:
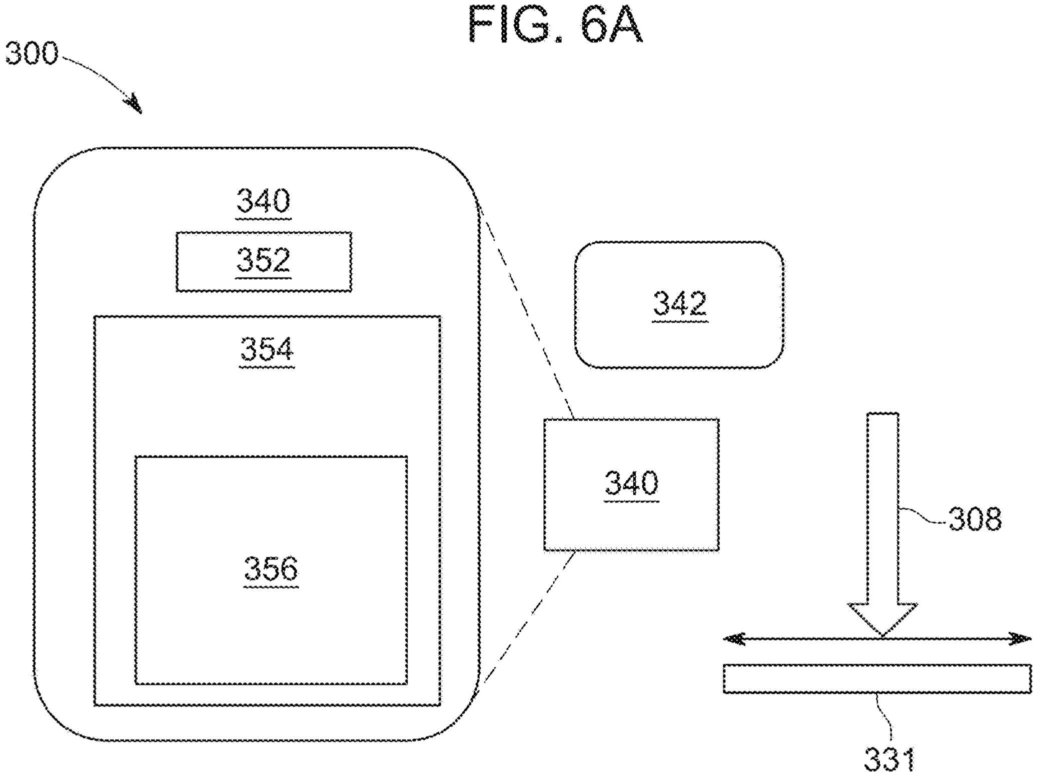

As further shown in FIG. 6B, the controller 340 may include a processor 352, such as a known type of microprocessor, dedicated processor chip, general purpose processor chip, or similar device. The controller 340 may further include a memory or memory unit 354, coupled to the processor 352, where the memory unit 354 contains a dose map routine 356. The dose map routine 356 may be operative on the processor 352 to manage scanning of the ion beam 308 and substrate 332 in order to impart a calculated dose map into the substrate 332. The memory unit 354 may comprise an article of manufacture. In one embodiment, the memory unit 354 may comprise any non-transitory computer readable medium or machine readable medium, such as an optical, magnetic or semiconductor storage. The storage medium may store various types of computer executable instructions to implement one or more of logic flows described herein. Examples of a computer readable or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The embodiments are not limited in this context.

Figure 7:
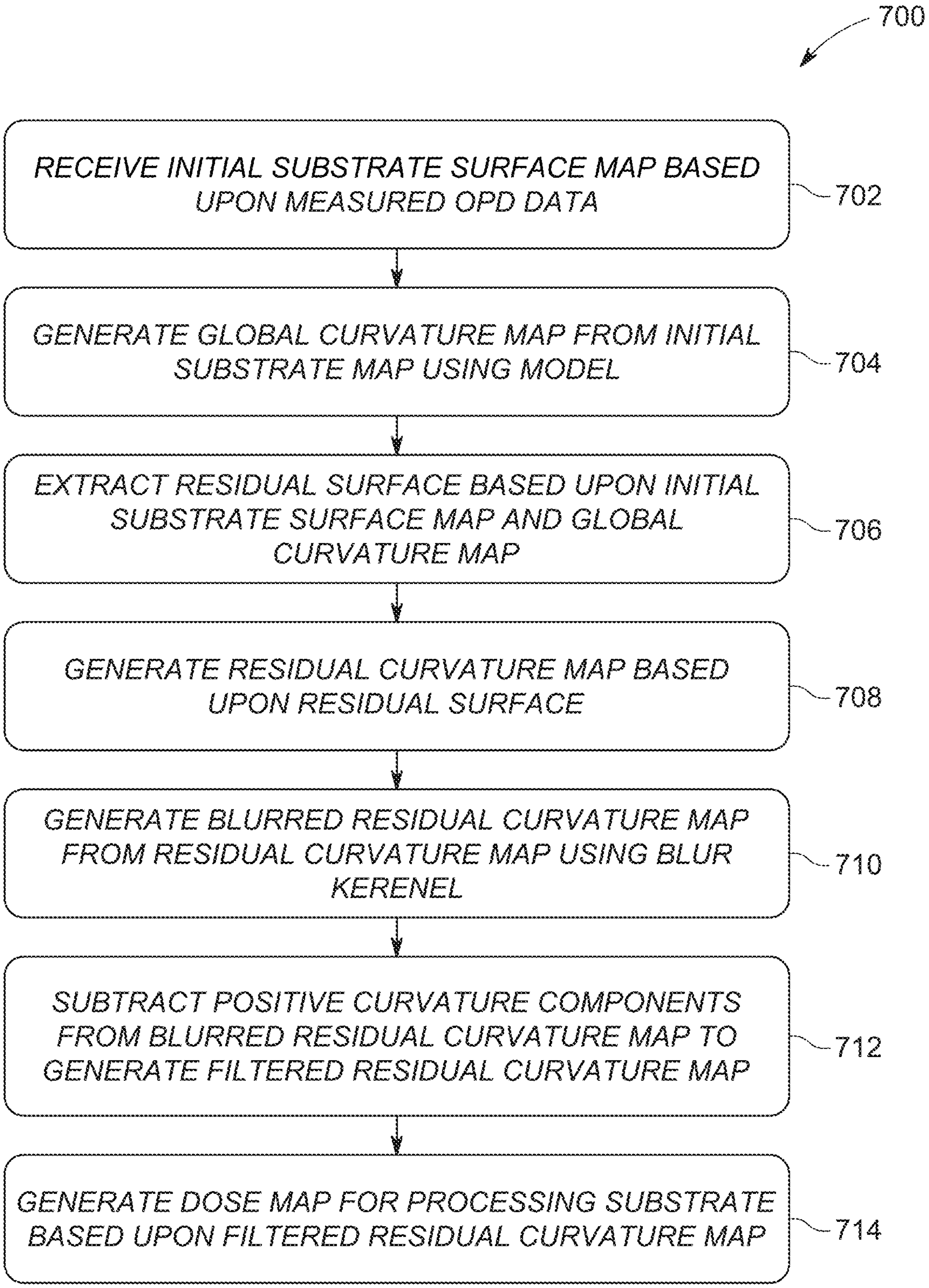
FIG. 7 depicts an exemplary process flow.

Turning now to FIG. 7, there is shown a process flow 700, according to some embodiments of the disclosure. At block 702, an initial substrate surface map is received. The substrate surface map may represent three dimensional coordinates of a set of points on the substrate surface, and may represent a map of OPD as a function of x, y coordinate, where the OPD is represented by the z-coordinate of a given surface point with respect to a reference x,y plane.

At block 704, a global curvature map is generated from the initial substrate surface map using a model. In some examples, the global curvature map may correspond to a surface that is modeled as a paraboloid using a mean model or Gaussian model, as detailed hereinabove.

At block 706, a residual surface is extracted based upon the initial substrate surface map and the global curvature map. As such, the residual surface may include residual or local regions of OPD in different x,y portions of the substrate.

At block 708, a residual curvature map is generated based upon the residual surface. The residual curvature map may plot curvature in inverse length as a function of x,y location across the substrate in question.

At block 710, a blurred residual curvature map is generated from the residual curvature map, using a blur kernel. The blurred residual curvature map may present the same qualitative pattern of curvature regions as the residual curvature map, while the width the regions may be broader and the curvature values different from their unblurred counterparts. This blurring may be used to account for size effects, such as beam size for a scanning energy source used to implement a dose map based upon the residual curvature map.

At block 712, any positive curvature components from the blurred residual curvature map are subtracted to generate a filtered residual curvature map.

At block 714, a dose map is generated for processing the substrate based upon the filtered residual curvature map. The dose map may present a qualitatively similar pattern as the filtered residual curvature map where relative dose is increased in x,y regions of relative higher curvature.

Figure 8:
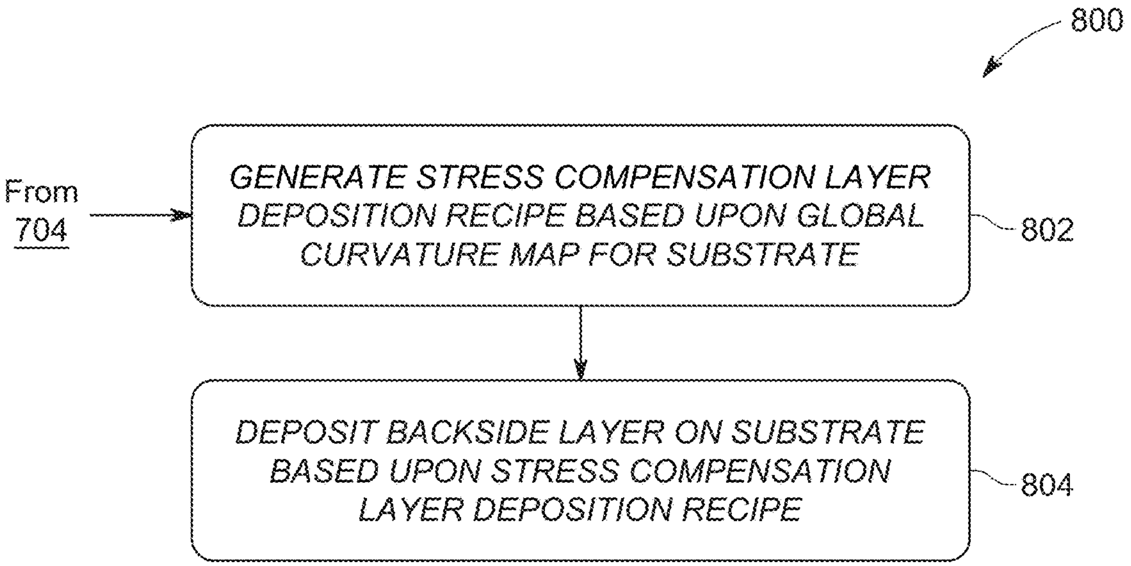
FIG. 8 depicts another exemplary process flow.

Turning now to FIG. 8, there is shown a process flow 800, according to some embodiments of the disclosure. At block 802, the flow continues from block 704. In particular, a stress compensation layer deposition recipe is generated based upon the global curvature map for the given substrate. The recipe may specify layer type, deposition conditions, and layer thickness, to name a few parameters.

At block 804, a backside layer is deposited on the given substrate based upon the stress compensation layer deposition recipe.

Figure 9:
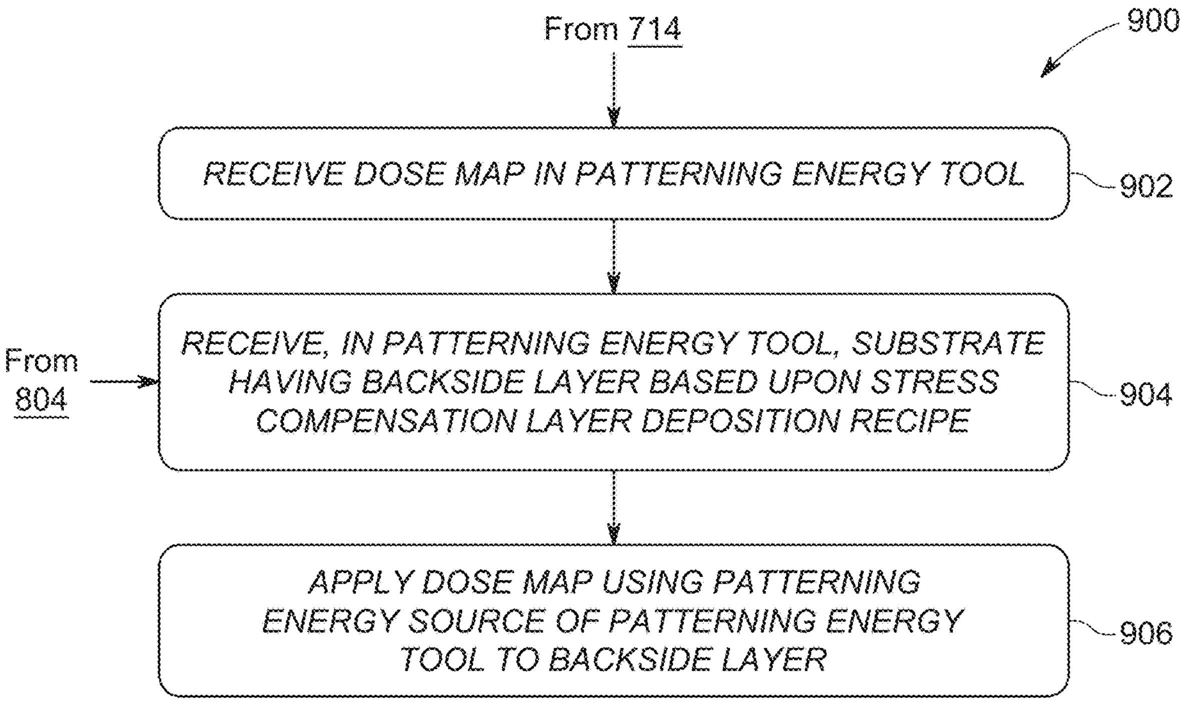
FIG. 9 depicts a further exemplary process flow.

Turning now to FIG. 9, there is shown a process flow 900, according to some embodiments of the disclosure. At block 902, the flow proceeds from block 714, where a dose map as detailed in process flow 700 is received in a patterning energy tool, such as an ion implanter.

At block 904, the flow proceeds from block 804, where the substrate having the backside layer based upon stress compensation layer deposition recipe is received in the patterning energy tool.

At block 906 the dose map is applied to the backside layer using a patterning energy source of the patterning energy tool, such as a scanning ion beam.

Advantages provided by the present embodiments are multifold. As a first advantage, the present approach allows subsequent device to proceed with more accuracy, such as subsequent lithography steps requiring low in plane distortion. As a second advantage, the present approach more accurately reduces regions of greater in plane distortion by targeting residual areas of greater substrate curvature for greater energetic treatment.

The present disclosure is not to be limited in scope by the specific embodiments described herein. Indeed, other various embodiments and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, the present disclosure has been described herein in the context of a particular implementation in a particular environment for a particular purpose, yet those of ordinary skill in the art will recognize the usefulness is not limited thereto and the present disclosure may be beneficially implemented in any number of environments for any number of purposes. Thus, the claims set forth below are to be construed in view of the full breadth and spirit of the present disclosure as described herein.

What is claimed is:

1. A method, comprising:
- generating a residual curvature map for a substrate, the residual curvature map being based upon a measurement of a surface of the substrate;
- generating a dose map based upon the residual curvature map, the dose map being for processing the substrate using a patterning energy source; and
- applying the dose map to process the substrate using the patterning energy source, wherein the generating the residual curvature map comprises:
  - modeling a global curvature map based upon an initial substrate surface map of out-of-plane distortion of a surface of the substrate; and
  - extracting the global curvature map from the initial substrate surface map to generate a raw residual curvature map.

2. The method of claim 1, wherein the generating the residual curvature map further comprises:
- applying a blur kernel operation to the raw residual curvature map.

3. The method of claim 2, the generating the residual curvature map further comprising applying a filter to filter out positive curvature from the residual curvature map.

4. The method of claim 2, wherein a substrate curvature as represented by the global curvature map is removable by performing a blanket processing operation.

5. The method of claim 4, wherein the blanket processing operation comprises depositing a stress compensation layer on a backside of the substrate.

6. The method of claim 5, wherein the stress compensation layer comprises: silicon nitride, silicon oxide, silicon oxynitride, or a layer containing any combinations of Si—O—N—C.

7. The method of claim 1, wherein the applying the dose map comprises:
- exposing a stress compensation layer on a backside of the substrate to the patterning energy source, and
- scanning the patterning energy source over the stress compensation layer in a pattern in order to transfer the dose map into the substrate, without using a mask.

8. The method of claim 1, the patterning energy source comprising an ion beam, an electron beam or a laser beam.

9. A method, comprising:
- receiving a substrate surface map of a substrate, comprising a map of out-of-plane distortion of the substrate;
- modeling a global curvature map from the substrate surface map;
- generating a residual curvature map by extracting the global curvature map from the substrate surface map;
- generating a dose map based upon the residual curvature map, the dose map being for processing the substrate using a patterning energy source; and
- applying the dose map to process the substrate using the patterning energy source.

10. The method of claim 9, wherein the extracting the global curvature map from the substrate surface map generates a raw residual curvature map, the method further comprising:
- using a beam profile of the patterning energy source to create a blur kernel; and
- applying the blur kernel to the raw residual curvature map to generate a blurred residual curvature map.

11. The method of claim 10, further comprising:
- applying a filter to filter out positive curvature from the blurred residual curvature map.

12. The method of claim 9, wherein a substrate curvature as represented by the global curvature map is removable by performing a blanket processing operation.

13. The method of claim 12, wherein the blanket processing operation comprises depositing a stress compensation layer on a backside of the substrate.

14. The method of claim 13, wherein the stress compensation layer comprises: silicon nitride, silicon oxide, silicon oxynitride, or a layer containing any combinations of Si—O—N—C.

15. The method of claim 9, wherein the applying the dose map comprises:
- exposing a stress compensation layer on a backside of the substrate to the patterning energy source, and
- scanning the patterning energy source over the stress compensation layer in a pattern in order to transfer the dose map into the substrate, without using a mask.

16. The method of claim 9, the patterning energy source comprising an ion beam, an electron beam or a laser beam.

17. A method, comprising:
- receiving a substrate surface map of a substrate, comprising a map of out-of-plane distortion (OPD) of the substrate based upon a set of measured OPD;
- generating a global curvature map from the substrate surface map using a model;
- extracting a residual surface based upon the substrate surface map and the global curvature map;
- generating a raw residual curvature map based upon the residual surface;
- generating a dose map based upon the raw residual curvature map; and
- applying the dose map to process the substrate using a patterning energy source.

18. The method of claim 17, wherein the generating the dose map based upon the raw residual curvature map comprises:
- using a beam profile of the patterning energy source to create a blur kernel;

applying the blur kernel to the raw residual curvature map to generate a blurred residual curvature map; and applying a filter to filter out positive curvature from the blurred residual curvature map.

19. The method of claim 17, wherein the model comprises a Gaussian curvature model or a mean curvature model.

* * * * *